US007099644B2

(12) United States Patent
Whikehart et al.

(10) Patent No.: US 7,099,644 B2
(45) Date of Patent: Aug. 29, 2006

(54) BEAMSTEERING CONTROL SYSTEM FOR A VEHICLE RADIO RECEIVER

(75) Inventors: J. William Whikehart, Novi, MI (US); Darby Edward Hadley, Westborough, MA (US); John Elliott Whitecar, Plymouth, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 377 days.

(21) Appl. No.: 10/040,857

(22) Filed: Dec. 28, 2001

(65) Prior Publication Data

US 2003/0125003 A1 Jul. 3, 2003

(51) Int. Cl.
*H04B 1/06* (2006.01)
(52) U.S. Cl. ............... 455/273; 455/277.2; 455/562.1; 455/277.1; 455/137; 375/347; 375/267
(58) Field of Classification Search ............ 455/277.2, 455/272, 150.1, 132, 277.1, 631, 134–135, 455/270, 271, 274–276.1, 101, 137, 160.1–166.1, 455/188.1–193.1, 67.11, 63.1, 67.13, 13.3, 455/293, 139, 506, 83, 82, 65, 269, 63.3, 455/62, 121, 129, 562.1, 575.7, 426.1, 334, 455/575.1, 550.1, 140, 273, 278.1–279.1, 455/539, 67.14; 375/224, 227, 316, 346, 375/349, 347, 267, 260, 146, 299; 343/713, 343/853, 766, 767, 702, 770, 725, 700, 729, 343/859, 795, 797, 754, 815; 342/361, 359, 342/383, 375, 374, 378, 372, 382, 380, 377; 333/132, 101
See application file for complete search history.

(56) References Cited

U.S. PATENT DOCUMENTS

| 3,864,633 | A | * | 2/1975 | Strenglein .................... 455/134 |
| 4,217,587 | A | | 8/1980 | Jacomini |
| 4,850,037 | A | | 7/1989 | Bochmann |
| 5,345,602 | A | | 9/1994 | Wiedemann et al. |
| 5,404,588 | A | | 4/1995 | Henze |
| 5,710,995 | A | * | 1/1998 | Akaiwa et al. .......... 455/277.2 |
| 5,778,324 | A | | 7/1998 | Smith |
| 5,887,247 | A | * | 3/1999 | Baltus et al. ............ 455/277.2 |
| 6,064,865 | A | * | 5/2000 | Kuo et al. .................. 455/135 |
| 6,141,536 | A | | 10/2000 | Cvetkovic et al. |
| 6,577,353 | B1 | * | 6/2003 | Welles et al. ............... 348/706 |
| 2002/0004375 | A1 | | 1/2002 | Spencer et al. |
| 2002/0080894 | A1 | | 6/2002 | Dabak et al. |
| 2002/0168955 | A1 | * | 11/2002 | Wildhagen ............... 455/277.1 |
| 2004/0116086 | A1 | * | 6/2004 | Huttunen .................... 455/130 |

FOREIGN PATENT DOCUMENTS

| DE | 2017869 | 4/1970 |
| EP | 1 033 826 A2 | 9/2000 |
| EP | 1 227 542 A1 | 7/2002 |
| GB | 2 314 234 A | 12/1997 |

* cited by examiner

*Primary Examiner*—Edward F. Urban
*Assistant Examiner*—Charles Chow
(74) *Attorney, Agent, or Firm*—Brinks Hofer Gilson & Lione

(57) ABSTRACT

A vehicle radio receiver has a beamsteering control system with two signal paths. One signal path generates an audio signal in response to incoming radio signals. Another signal path generates a test signal in response to the incoming radio signals. The audio signal is adjusted in response to the test signal.

29 Claims, 5 Drawing Sheets

BEAMSTEERING CONTROL SYSTEM FOR A VEHICLE RADIO RECEIVER

FIELD OF THE INVENTION

This invention generally relates to radio receivers having spaced antennas.

More particularly, this invention relates to radio receivers using radio frequency (RF) signals from spaced antennas to generate audio signals.

BACKGROUND OF THE INVENTION

Nearly every vehicle has a radio receiver for receiving broadcast radio frequency (RF) signals such as amplitude modulation (AM) and frequency modulation (FM) signals. Many vehicle radio receivers also receive radio data system (RDS) signals. Vehicles include automobiles, trucks, bases, and the like.

Most radio receivers use omni-directional antennas to address the almost constantly changing reception conditions in a moving vehicle. The reception quality of RF signals and especially RDS signals usually is impaired by the multipath distortion associated with these antennas. Multipath distortion typically is a localized effect resulting from the interaction between multiple signals from a transmitter. Some broadcast signals bounce or reflect off objects such as buildings, mountains, and the like. The bounced or reflected signal and the direct signal often are not in phase or synchronized when received by an omni-directional antenna. The data in these out-of-phase or unsynchronized signals are often scrambled or otherwise unusable by the radio receiver.

Many radio receivers have multiple antennas to reduce multipath distortion. The antennas are spaced apart on the vehicle. The radio receiver switches between the spaced antennas to lessen the impact of multipath distortion. The spacing of the antennas reduces the likelihood of the antennas experiencing multipath distortion events at the same time.

Some radio receivers mix the incoming RF signals from the antennas to reduce the multipath distortion. The mixture of the RF signal forms a combined signal. The proportion of each RF signal in the combined signal usually is responsive to the signal quality of each RF signal. Signal quality generally is related to various characteristics of an RF signal such as the signal strength, the signal noise, and the like. The radio receiver generates the audio signal in response to the combined signal. The radio receiver usually checks the signal quality of the separate RF signals along the same signal path where the receiver adjusts the proportions of the RF signals to create the combined signal.

Other radio receivers switch to alternate frequencies to reduce multipath distortion. The alternate frequencies transmit the identical audio program. The radio receiver usually monitors the alternate frequencies to determine whether an alternate frequency has better signal quality. The radio receiver switches to each alternate frequency momentarily and then switches back to the original frequency. Some radio receivers avoid the resulting switching effect in the audio signal by stopping the mixing of the incoming RF signals. These radio receivers use one RF signal to continue generation of the audio signal and another RF signal to monitor the alternate frequencies.

SUMMARY

The invention provides a vehicle radio receiver with a beamsteering control system having two signal paths, each responsive to incoming radio signals. A test signal generated on one signal path adjusts the signal quality of a signal generated on the other signal path.

In one aspect, a vehicle radio receiver has a first mixer circuit and a second mixer circuit. The first mixer circuit is operable to generate a receiver signal from first and second signals. The receiver signal is characterized by a receiver signal quality. The second mixer circuit is operable to generate a test signal from a different combination of the first and second signals. The test signal characterized by a test signal quality. The first mixer circuit is operable to reset the combination of the first and second signals for the receiver signal in response to the test signal when the test signal quality exceeds the receiver signal quality.

In another aspect, a vehicle radio receiver has a first mixer circuit, a second mixer circuit, a first tuner, and a second tuner. The first mixer circuit is operable to generate a radio frequency (RF) receiver signal characterized by a receiver steering solution. The receiver steering solution represents the proportion of a first RF signal and a second RF signal in the RF receiver signal. The second mixer circuit is operable to generate an RF test signal characterized by a test steering solution. The test steering solution represents the proportion of the first RF signal and the second RF signal in the RF test signal. The first tuner is connected to the first mixer circuit. The first tuner is operable to generate a receiver signal in response to the RF receiver signal. The receiver signal has a receiver signal quality. The second tuner is connected to the second mixer circuit. The second tuner is operable to generate a test signal in response to the RF test signal. The test signal has a test signal quality. The first mixer circuit is operable to reset the RF receiver signal in response to the test steering solution when the test signal quality exceeds the receiver signal quality.

In one method for beamsteering control in a vehicle radio receiver, a receiver signal is generated in response to a first radio signal and a second radio signal. The receiver signal has a receiver signal quality. A test signal is generated in response to a first test steering solution. The first test steering solution represents the proportion of the first and second radio signals in the test signal. The test signal has a test signal quality. The receiver signal is reset in response to the first test steering solution when the test signal quality exceeds the receiver signal quality.

In another method for beamsteering control in a vehicle radio receiver, a receiver signal is generated in response to a first radio signal and a second radio signal. A receiver signal quality of the receiver signal is measured. A first test steering solution is generated in response to the first radio signal. A first test signal quality of a first test signal is measured. The first test signal is responsive to the first test steering solution. The receiver signal is reset in response to the first test steering solution when the first test signal quality exceeds the receiver signal quality.

Other systems, methods, features, and advantages of the invention will be or will become apparent to one skilled in the art upon examination of the following figures and detailed description. All such additional systems, methods, features, and advantages are intended to be included within this description, within the scope of the invention, and protected by the accompanying claims.

BRIEF DESCRIPTION OF THE FIGURES

The invention may be better understood with reference to the following figures and detailed description. The components in the figures are not necessarily to scale, emphasis being placed upon illustrating the principles of the invention. Moreover, like reference numerals in the figures designate corresponding parts throughout the different views.

DETAILED DESCRIPTION OF THE PREFERRED EMBODIMENT

Figure 1:
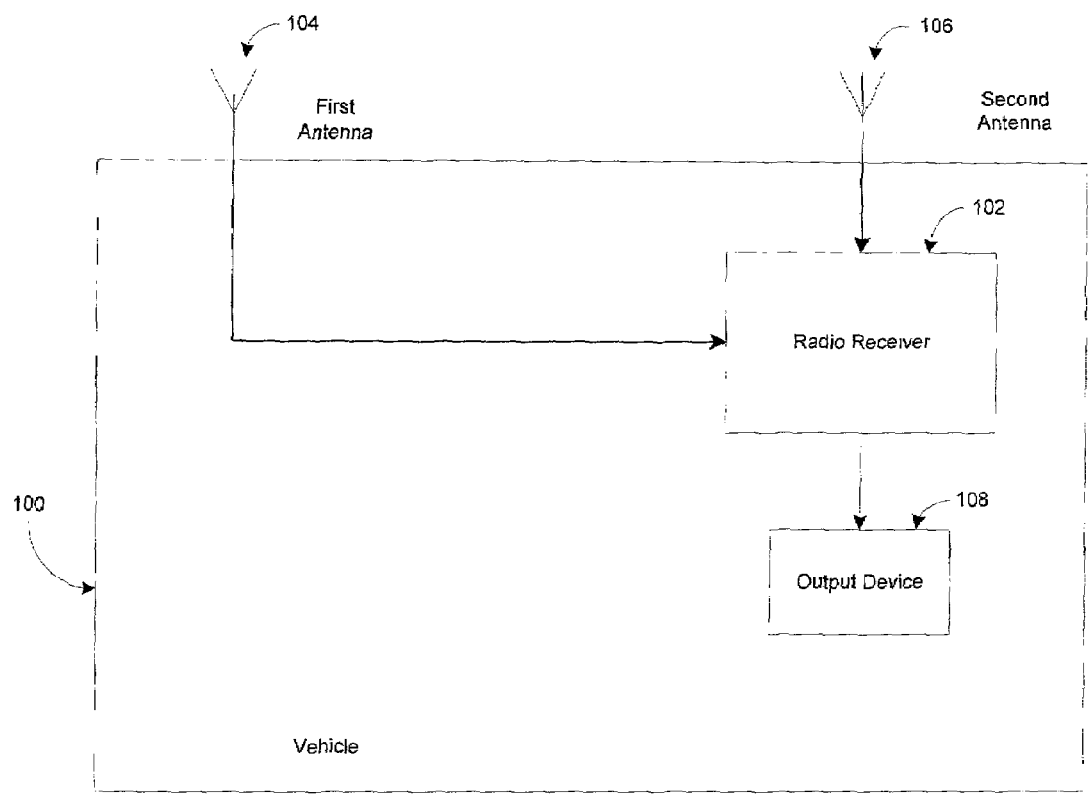
FIG. 1 represents a block diagram of a vehicle having a radio receiver with a beamsteering control system according to an embodiment.

FIG. 1 represents a block diagram of a vehicle 100 having a radio receiver 102 with a beamsteering control system according to an embodiment. Vehicles include automobiles, trucks, buses, and the like. The radio receiver 102 is connected to a first antenna 104, a second antenna 106, and an output device 108. In one aspect, the radio receiver 102 and antennas 104 and 106 are configured for receiving and processing frequency modulation (FM) signals having a frequency in the range of about 88 MHz through about 108 MHz. The FM signals may include radio data signals. Other frequencies and modulations may be used. While particular configurations are shown, other configurations and arrangements may be used including those with fewer and additional components.

The antennas 104 and 106 may be any radio reception devices for providing radio frequency (RF) signals to the radio receiver 102. The antennas 104 and 106 may be the same or different radio reception devices. The antennas may be spaced or disposed to reduce multiple events. In one aspect, antenna 104 is a vertical whip or mast antenna and antenna 106 is an on-glass conformable antenna. In this aspect, antennas 104 is mounted on a front portion of the vehicle 100 and antenna 106 is mounted on a rear window of the vehicle 100.

The output device 108 may be one or more speakers or other audio reproduction devices. There may be several speakers disposed throughout the vehicle 100. The output device 108 may include a display device for indicating operating and performance parameters of the radio receiver 102 and incurring RF signals. The display device may be incorporated with a control interface described below.

Figure 2:
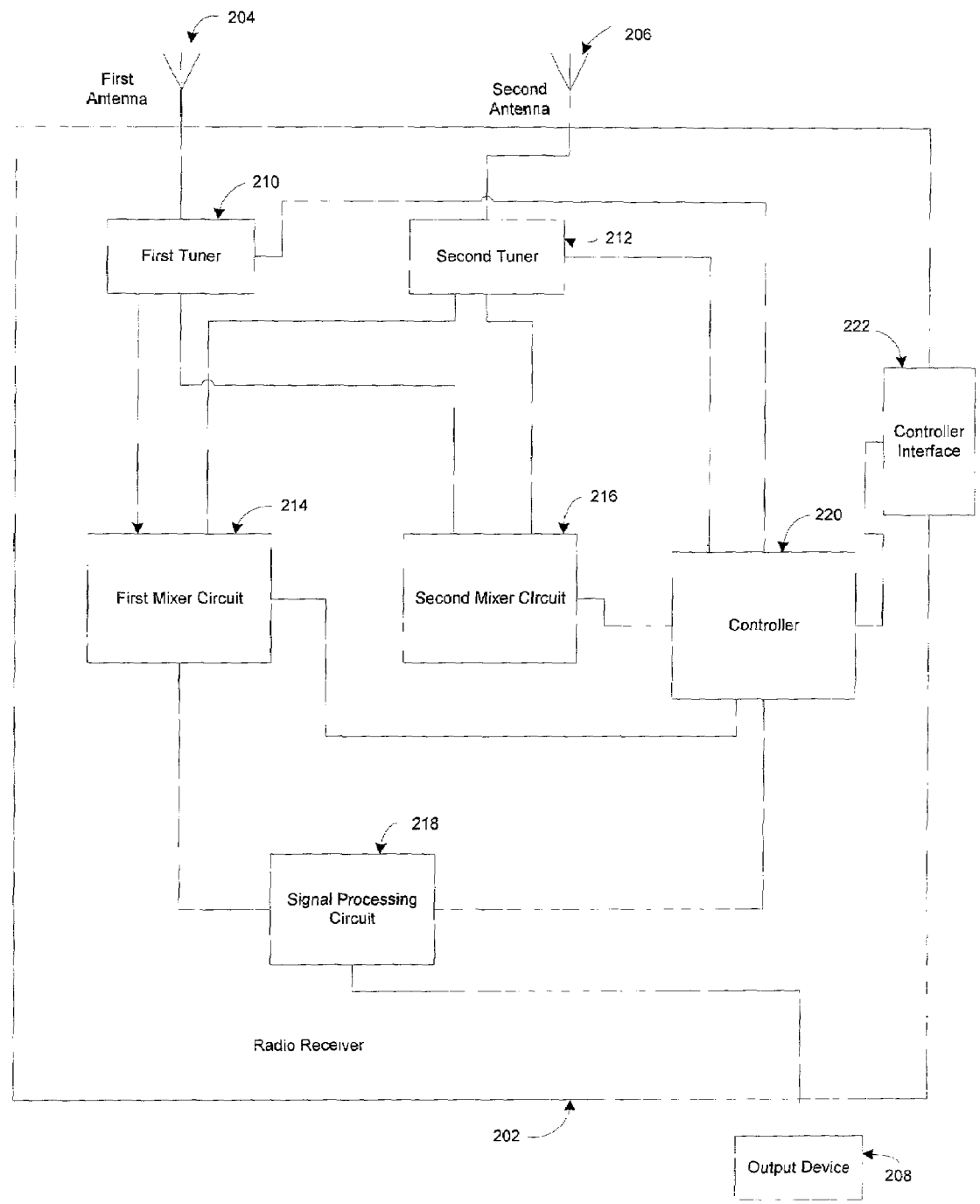
FIG. 2 represents a radio receiver with a beamsteering control system according to one embodiment.

FIG. 2 represents a radio receiver 202 with a beamsteering control system according to one embodiment. The radio receiver 202 is connected to a first antenna 204, a second antenna 206, and an output device 208. The radio receiver 202 comprises a controller 220 connected to a first tuner 210, a second tuner 212, a first mixer circuit 214, a second mixer circuit 216, and a signal processing circuit 218. The controller 220 is connected to a control interface 222. The radio receiver 202 forms two signal paths responsive to the incoming RF signals. The first signal path generates an audio signal from the RF signals. The first signal path extends from the first and second antennas 204 and 206, through the first and second tuners 210 and 212, through the first mixer circuit 214, to the signal processing circuit 218. The second signal path searches for signal steering solutions responsive to the RF signals. The second signal path extends from the first and second antennas 204 and 206, through the first and second tuners 210 and 212, to the second mixer circuit 216. The radio receiver 202 may have other components and arrangements including those with different signal paths.

The first tuner 210 receives a first radio frequency (RF) signals from the first antenna 204. The first tuner 210 amplifies and filters the first RF signal to provide a first intermediate frequency (IF) or multiplex (MPX) signal to the first mixer circuit 214 and the second mixer circuit 216. The first IF or MPX signal is selected in response to a frequency control signal from the controller 220.

The second tuner 212 receives a second RF signal from the second antenna 206. The second tuner 212 amplifies and filters the second RF signal to provide a second IF or MPX signal to the first mixer circuit 214 and the second mixer 216. The second IF or MPX signal is selected in response to the frequency control signal from the controller 220.

The first mixer circuit 214 provides a receiver signal to the signal processing circuit 218 in response to the first and second IF or MPX signals. The receiver signal may be the first IF or MPX signal, the second IF or MPX signal, or a combination thereof. The receiver signal can be characterized by a receiver steering solution, which represents the proportion of the first and second IF or MPX signals in the receiver signal. The receiver signal also can be characterized a receiver signal quality, which may be a measured parameter such as signal noise and signal strength, or the difference from a standard level for a parameter.

The signal processing circuit 218 provides one or more data or audio signals to the output device 208 in response to the receiver signal. The signal processing circuit 218 decodes and amplifies the receiver signal. The signal processing circuit 218 may perform other or additional processing of the receiver signal.

The second mixer circuit 216 generates a test signal in response to the first and second IF or MPX signals. The test signal may be the first IF or MPX signal, the second IF or MPX signal, or a combination thereof. The test signal can be characterized by a test steering solution which represents the proportion of the first and second IF or MPX signals in the test signal. The test signal also can be characterized by a test signal quality, which may be a measured level or a difference from a standard as previously discussed.

The controller 220 searches for test steering solutions having a test signal quality that exceeds the receiver signal quality. "Exceeds" includes any level or measurement where the quality is improved. "Exceeds" may include the slightest increase or other indication of an improvement in quality. To reduce flutter or other rapid signal changes, "exceeds" may indicate a quality measurement greater than a predetermined level, where the predetermined level is a measured amount above where the signal qualities are equal or above a current quality level of the receiver signal. The test steering solutions characterize the proportion of the incoming RF signals in the test signals. The test signal varies as the proportion changes. The proportions include just one of the RF signals, a mix of the RF signals, a portion of one RF signal, and the like. The test signal quality may change and may remain the same as the test signal changes. Any searching technique may be used as discussed below. The controller 220 compares the test signal quality of each test steering solution with the receiver signal quality according to the search technique. When the test signal quality exceeds the receiver signal quality, the controller 220 resets or changes the receiver steering solution to the test steering solution, which changes the receiver signal to be the same as the test signal having the better quality. The controller 220 searches for test steering solutions continuously or at intervals. The controller 220 may reset or change the receiver steering solution whenever a better test steering solution is available. The controller may reset or change the receiver steering solution after comparing the receiver signal quality with the test signal qualities from a group of test steering solutions. The group may comprise part or all of the available test steering solutions.

Figure 3:
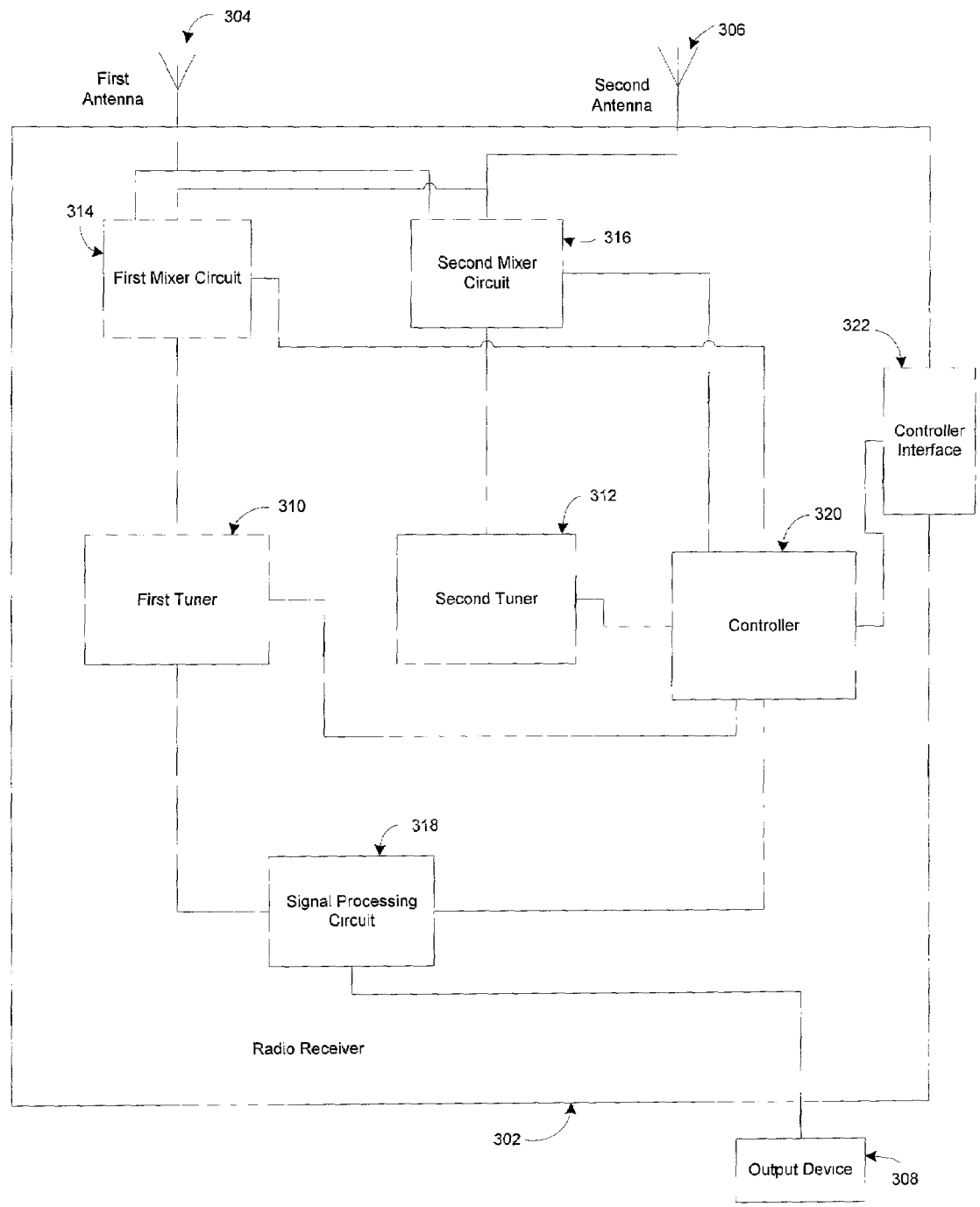
FIG. 3 represents a radio receiver with a beamsteering control system according to another embodiment.

FIG. 3 represents a radio receiver 302 with a beamsteering control system according to another embodiment. The radio receiver 302 is connected to a first antenna 304, a second antenna 306, and an output device 308. The radio receiver 302 comprises a controller 320 connected to a first tuner 310, a second tuner 312, a first mixer circuit 314, a second mixer circuit 316, and a signal processing circuit 318.

The controller is connected to a control interface 322. The radio receiver 302 forms two signal paths responsive to the incoming RF signals. The first signal path generates an audio signal from the RF signals. The first signal path extends from the first and second antennas 304 and 306, through the first mixer circuit 314, through the first tuner 310, to the signal processing circuit 318. The second signal path searches for signal steering solutions responsive to the RF signals. The second signal path extends from the first and second antennas 304 and 306, through the second mixer circuit 316, to the second tuner 312. The radio receiver 302 may have other components and arrangements.

The first mixer circuit 314 receives a first radio frequency (RF) signal from the first antenna 304 and a second RF signal from the second antenna 306. The first mixer circuit 314 provides an RF receiver signal to the first tuner 310 in response to the first and second RF signals. The RF receiver signal is characterized by an RF steering solution, which represents the proportion of the first and second RF signals in the RF receiver signal.

The first tuner 310 receives the RF receiver signal from the first mixer circuit 314. The first tuner 310 amplifies and filters the RF receiver signal to provide an intermediate frequency (IF) or multiplex (MPX) receiver signal to the signal processing circuit 318. The IF or MPX receiver signal is selected in response to a frequency control signal from the controller 320. The IF or MPX receiver signal has a RF receiver signal quality, which may be a measured level or a difference from a standard. The signal processing circuit 318 provides one or more data or audio signals to the output device 208 in response to the IF or MPX receiver signal.

The second mixer circuit 316 receives the first RF signal from the first antenna 304 and the second RF signal from the second antenna 306. The second mixer circuit 316 provides an RF test signal to the second tuner 312 in response to the first and second RF signals. The RF test signal is characterized by an RF test steering solution, which represents the proportion of the first and second RF signals in the RF test signal.

The second tuner 312 receives the RF test signal from the second mixer circuit 316. The second tuner 312 amplifies and filters the RF test signal to provide an IF or MPX test signal. The IF or MPX test signal is selected in response to the frequency control signal from the controller 320. The IF or MPX test signal has a test signal quality, which may be a measured parameter or a difference from a standard.

The controller 320 searches for RF test steering solutions having a test signal quality that exceeds the receiver signal quality. The controller 320 compares the test signal quality of an RF test steering solution with the receiver signal quality. When the test signal quality exceeds the receiver signal quality, the controller resets or changes the RF receiver steering solution to the RF test steering solution.

Figure 4:
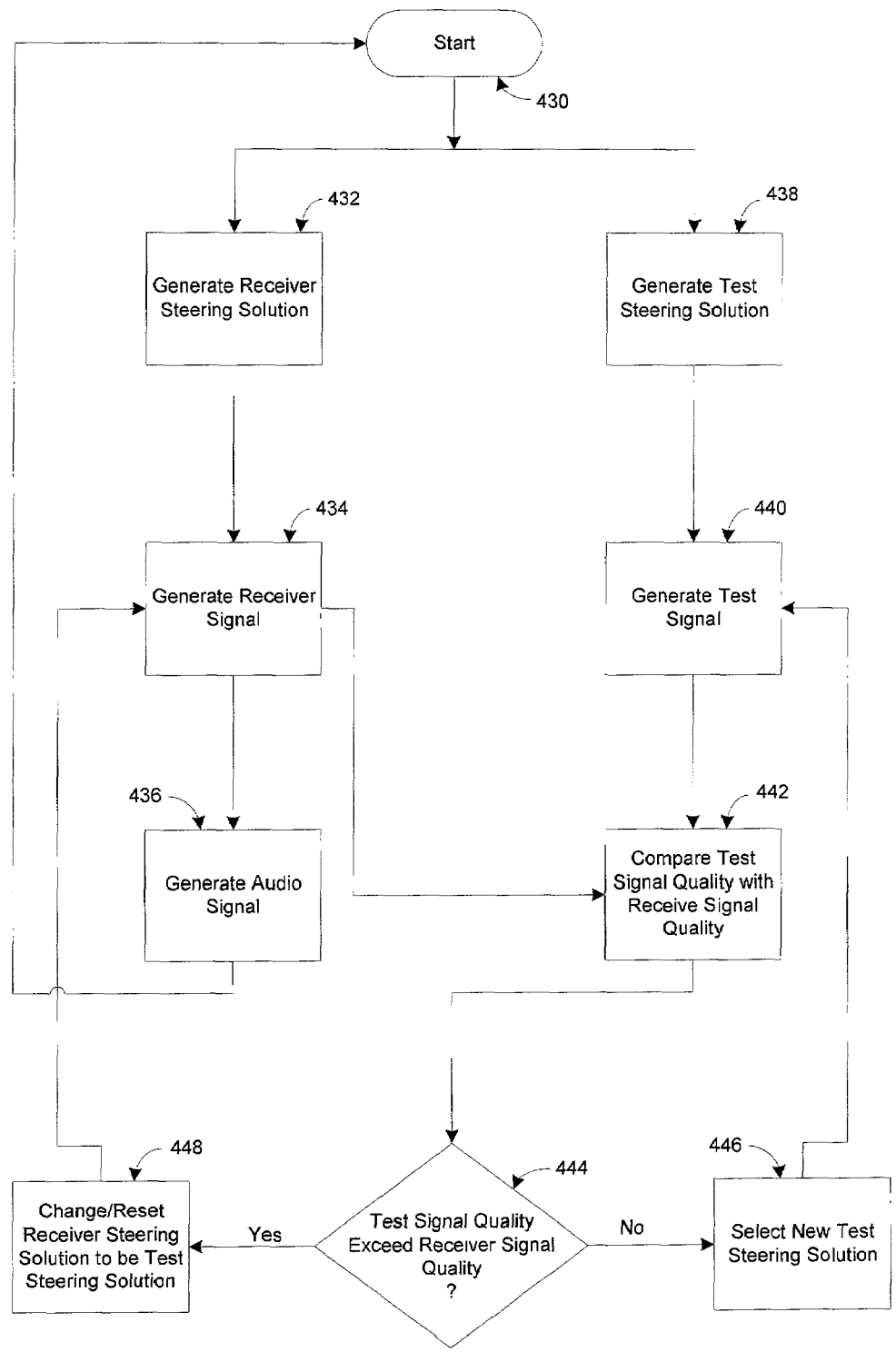
FIG. 4 is a flowchart of a method for beamsteering control in a vehicle radio receiver according to an embodiment.

FIG. 4 is a flowchart of a method for beamsteering control in a vehicle radio receiver according to an embodiment. At start 430, a first radio signal and a second audio signal are received. The first and second radio signals may be radio frequency (RF) signals received through antennas. The RF signals may be frequency modulation (FM) signals having a frequency in the range of about 88 MHz through about 108 MHz. The RF signals may include radio data signals. Other frequencies and modulations may be used. The first and second radio signals may be intermediate frequency (IF) or multiplex (MPX) signals generated by tuners in response to radio frequency (RF) signals.

The radio receiver generates 432 a receiver steering solution for the first and second radio signals. The receiver steering solution may be initially set at a predetermined level. The receiver steering solution may be initially set in response to the quality of the incoming RF signals. The receiver steering solution may be set by other methods including those related to the search technique used to search for test steering solutions. The receiver steering solution represents the proportion of the first and second radio signals in the receiver signal. The radio receiver generates 434 a receiver signal in response to the first receiver steering solution. The receiver signal has a receiver signal quality, as previously discussed. The radio receiver generates 436 one or more audio and data signals in response to the receiver signal. The radio receiver continues 438 the generation of audio and data signals or returns to start 430.

The radio receiver generates 438 a first test steering solution for the first and second radio signals. The test steering solution may be set in similar fashion as the receiver steering solution. The test steering solution may be the same as the receiver steering solution initially. The test steering solution also may be set in relation to the search technique used. The first test steering solution represents the proportion of the first and second radio signals in the test signal. The radio receiver generates 440 a test signal in response to the first test steering solution. The test signal has a test signal quality as previously discussed.

The radio receiver compares 442 the test signal quality with the receiver signal quality. The radio receiver determines 444 whether the test signal quality exceeds the receiver signal quality. The signal quality may be assessed in response to a measured parameter such as signal noise and signal strength, a deviation from a standard, a combination thereof, or other factors. To reduce flutter or other rapid signal changes, the radio receiver may determine that the test signal quality exceeds the receiver signal quality when the test signal quality exceeds a predetermined level higher than the receiver signal quality. In one aspect, the predetermined level is about 10 percent of receiver signal quality.

If the test signal does not exceed the receiver signal quality, the radio receiver 446 selects a second test steering solution. The radio receiver generates 440 a new test signal in response to the second steering solution. The selection of the new test steering solution is in accordance with a search technique for the beamsteering system. Any search technique may be used for determination of the test steering solution. The search technique may be by trial-and-error where the second test steering solution is selected randomly, sequentially, or by another iterative approach.

The search technique may be an analytical or evaluative approach such as a steepest descent method. The radio receiver may search continuously or at intervals.

If the test signal quality exceeds the receiver signal quality, the radio receiver changes or sets 448 the receiver steering solution to be the same as the test steering solution.

The radio receiver generates 434 the receiver signal in response to the changed or reset receiver steering solution.

Figure 5:
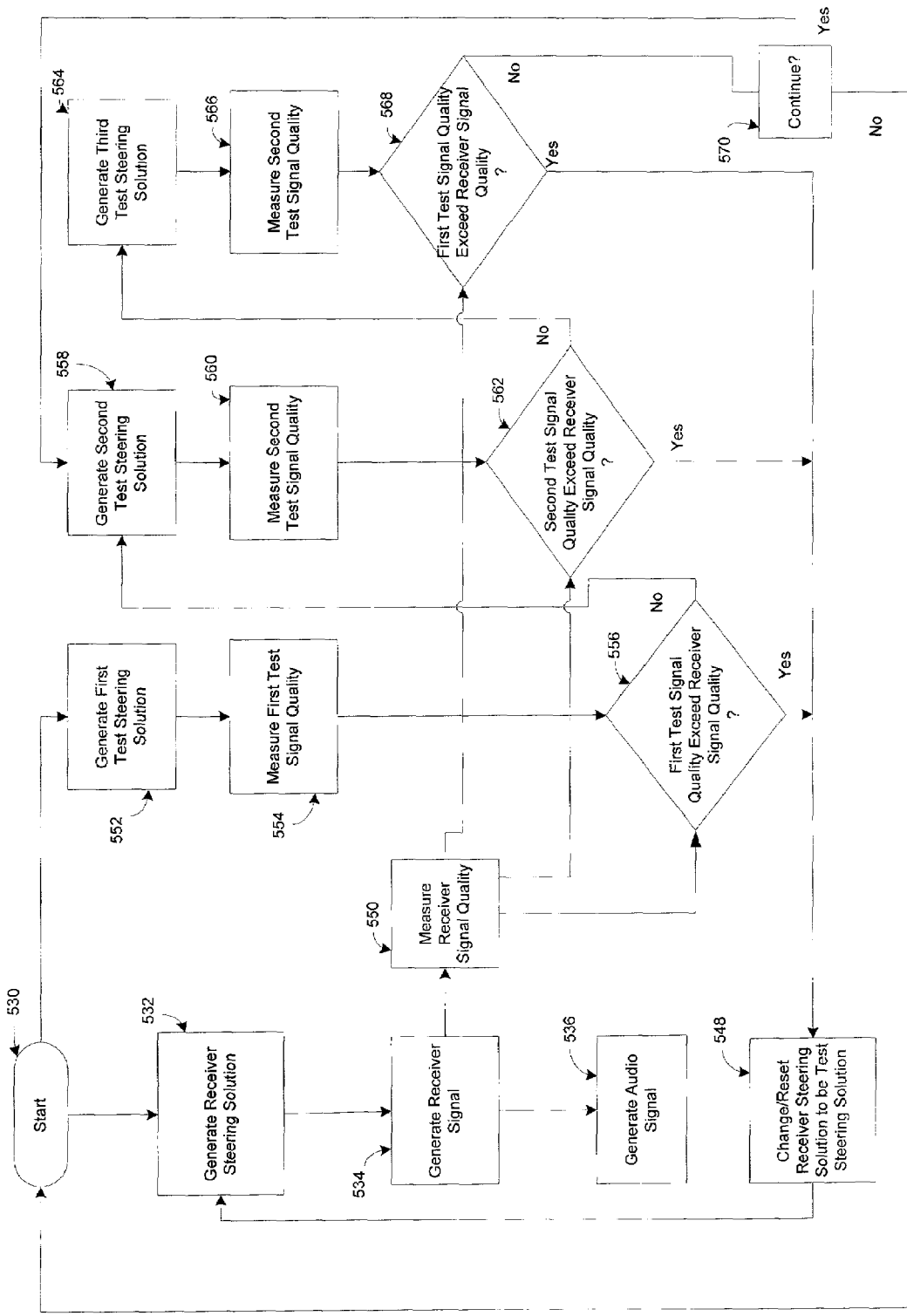
FIG. 5 is a flowchart of a method for beamsteering control in a vehicle radio receiver according to a further embodiment.

FIG. 5 is a flow chart of a method for beamsteering control in a vehicle radio receiver according to a further embodiment. At start 530, the radio receiver receives a first radio frequency (RF) signal and a second RF signal. The radio receiver generates 532 a receiver steering solution of the first and second RF signals. The radio receiver generates 534 a receiver signal in response to the receiver steering solution. The radio receiver measures 550 a receiver signal quality of the receiver signal. The radio receiver generates 536 one or more audio and data signals in response to the receiver signal.

The radio receiver generates 552 a first test steering solution in response to the first RF signal. The radio receiver measures 554 a first test signal quality of a first test signal responsive to the first test steering solution. The radio receiver determines 556 whether the first test signal quality exceeds the receiver signal quality. If the first test quality exceeds the receiver signal quality, the radio receiver changes or resets 548 the receiver steering solution to the first test steering solution. The radio receiver generates 534 receiver signal in response to the new receiver steering solution.

If the first test signal quality does not exceed the receiver signal quality, the radio receiver generates 558 a second test steering solution in response to the second RF signal. The radio receiver measures 560 a second test signal quality of a second test signal responsive to the second test steering solution. The radio receiver determines 562 whether the second test signal quality exceeds the receiver signal quality. If the second test signal quality exceeds the receiver signal quality, the radio receiver changes or resets 548 the receiver steering solution to the second test steering solution. The radio receiver 534 generates the receiver signal in response to the new receiver steering solution.

If the second test signal quality does not exceed the receiver signal quality, the radio receiver generates 564 a third test steering solution in response to the first and second RF signals. The radio receiver measures 566 a third test signal quality of a third test signal responsive to the third test steering solution. The radio receiver determines 568 whether the third test signal quality exceeds the receiver signal quality. If the third test signal quality exceeds the receiver signal quality, the radio receiver changes or resets 548 the receiver steering solution to the third test steering solution. The radio receiver 534 generates the receiver signal in response to the new receiver steering solution.

If the third test signal quality does not exceed the receiver signal quality, the radio receiver determines 570 whether to continue searching for another test steering solution in response to the first and second RF signals. If the searching continues, the radio receiver generates 558 an additional test steering solution. The radio receiver measures 560 an additional test signal quality of the additional test signal. The radio receiver determines 562 whether the additional test signal quality exceeds the receiver signal quality. This searching continues according to a selected searching technique until the search technique stops or an additional test steering solution provides a test signal quality that exceeds the receiver signal quality. The test search technique may stop because the searching technique is finished or has been interrupted. If the radio receiver cannot find an additional test steering solution having a test signal quality that exceeds the receiver signal quality, the radio receiver continues to start 530.

Various embodiments of the invention have been described and illustrated. However, the description and illustrations are by way of example only. Other embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

What is claimed is:

1. A vehicle radio receiver comprising:
a first mixer circuit operable to generate a receiver signal from first and second signals, the receiver signal characterized by a receiver signal quality; and
a second mixer circuit operable to generate a test signal from a different proportion of the first and second signals, the test signal characterized by a test signal quality,
where the first mixer circuit is operable to reset a proportion of the first and second signals for the receiver signal in response to the different proportion of the first and second signals of the test signal when the test signal quality exceeds the receiver signal quality.

2. The vehicle radio receiver according to claim 1,
where the second mixer is operable to generate a new test signal in response to a new proportion of the first and second signals, the new test signal characterized by a new test signal quality, and
where the first mixer circuit is operable to reset the receiver signal in response to the new proportion when the new test signal quality exceeds the receiver signal quality.

3. The vehicle radio receiver according to claim 1, where the first and second RF signals comprise frequency modulation (FM) signals having a frequency in the range of about 88 MHz through about 108 MHz.

4. The vehicle radio receiver according to claim 3, where the first and second RE signals comprise radio data services (RDS) signals.

5. The vehicle radio receiver according to claim 1, where the first and second signals comprise at least one of an intermediate frequency (IF) signal and a multiplex (MPX) signal.

6. The vehicle radio receiver according to claim 1, where at least one of the receiver signal quality and the test signal quality comprise at least one of a signal strength and a signal noise.

7. The vehicle radio receiver according to claim 1, wherein the first mixer circuit is operable to change the proportion of the first and second signals for generating the receiver signal by the first mixer circuit, based on the different proportion of the first and second signals and in response to the test signal when the test signal quality exceeds the receiver signal quality.

8. The vehicle radio receiver according to claim 1, wherein the first mixer circuit is operable to change the proportion of the first and second signals for generating the receiver signal by the first mixer circuit, to match the different proportion of the first and second signals in response to the test signal when the test signal quality exceeds the receiver signal quality.

9. A vehicle radio receiver comprising:
a first mixer circuit operable to generate a radio frequency (RF) receiver signal characterized by a receiver steering solution, the receiver steering solution representing a proportion of a first RF signal and a second RF signal in the RF receiver signal;

a second mixer circuit operable to generate an RF test signal characterized by a test steering solution, the test steering solution representing a proportion of the first RF signal and the second RF signal in the RF test signal;

a first tuner connected to the first mixer circuit the first tuner operable to generate a receiver signal in response to the RF receiver signal, the receiver signal having a receiver signal quality; and a second tuner connected to the second mixer circuit, the second tuner operable to generate a test signal in response to the RF test signal, the test signal having a test signal quality, where the first mixer circuit is operable to reset the proportion of the first and second RF signal in the receiver signal in response to the proportion of the first RF signal and second RF signal in the RF test signal, when the test signal quality exceeds the receiver signal quality.

10. The vehicle radio receiver according to claim 9, where the second mixer is operable to generate a new RF test signal in response to a new test steering solution, where the second tuner is operable to generate a new test signal in response to the new RF test signal, the new test signal having a new test signal quality, and where the first mixer circuit is operable to reset the RF receiver signal in response to the new test steering solution when the new test signal quality exceeds the receiver signal quality.

11. The vehicle radio receiver according to claim 9, where the first and second RF signals comprise frequency modulation (FM) signals having a frequency in the range of about 88 MHz through about 108 MHz.

12. The vehicle radio receiver according to claim 9, where the receiver and test signals comprise at least one of an intermediate frequency (IF) signal and a multiplex (MPX) signal.

13. The vehicle radio receiver according to claim 9, where the first and second RF signals comprise radio data services (RDS) signals.

14. The vehicle radio receiver according to claim 9, where the first and second mixers are configured to receive the first RF signal from a first antenna and the second RF signal from a second antenna, and where the first and second antennas are disposed at different positions on the vehicle.

15. The vehicle radio receiver according to claim 9, further comprising a signal processing circuit connected to the first tuner, the signal processing circuit operable to generate an audio signal in response to the receiver signal.

16. A method for beamsteering control in a vehicle radio receiver comprising:

generating a receiver signal in response to a first radio signal and a second radio signal, where the receiver signal has a receiver signal quality;

generating a test signal in response to a first test steering solution, where the first test steering solution represents a proportion of the first and second radio signals in the test signal, where the test signal has a test signal quality; and resetting a proportion of the first and second radio signal in the receiver signal to generate the receiver signal in response to the proportion of the first and second signals in the test signal when the test signal quality exceeds the receiver signal quality.

17. The method according to claim 16, where the first and second radio signals comprise radio frequency (RF) signals.

18. The method according to claim 17, where the RF signals comprise frequency modulation (FM) signals having a frequency in the range of about 88 MHz through about 108 MHz.

19. The method according to claim 17, where the RF signals comprise radio data services (RDS) signals.

20. The method according to claim 16, where the first and second radio signals comprise at least one of an intermediate frequency (IF) signal and a multiplex (MPX) signal.

21. The method according to claim 16, further comprising:

selecting a second test steering solution;

generating a new test signal in response to the second test steering solution, the new test signal having a new test signal quality; and resetting the receiver signal in response to the second test steering solution when the new test signal quality exceeds the receiver signal quality.

22. The method according to claim 16, further comprising: generating an audio signal in response to the receiver signal.

23. A method for beamsteering control in a vehicle radio receiver, comprising:

generating a receiver signal in response to a first radio signal and a second radio signal;

measuring a receiver signal quality of the receiver signal generating a first test steering solution in response to the first radio signal;

measuring a first test signal quality of a first test signal responsive to the first test steering solution; and resetting a proportion of the first and second radio signal in the receiver signal to generate the receiver signal in response to a proportion of the first and second radio signal in the first test signal when the first test signal quality exceeds the receiver signal quality.

24. The method according to claim 23, where the first and second radio signals comprise frequency modulated (FM) signals having a frequency in the range of about 88 MHz through about 108 MHz.

25. The method according to claim 23, where the first and second radio signals comprise at least one of an intermediate frequency (IF) signal and a multiplex (MPX) signal.

26. The method according to claim 23, where the first and second radio signals comprise radio data services (RDS) signals.

27. The method according to claim 23, further comprising:

generating a second test steering solution in response to the second radio signal;

measuring a second test signal quality of a second test signal responsive to the second test steering solution; and resetting the proportion of the first and second radio signal in response to the second test steering solution when the second test quality exceeds the receiver signal quality.

28. The method according to claim 27, further comprising:

generating a third test steering solution in response to the first and second radio signals;

measuring a third test signal quality of a third test signal responsive to the third test steering solution; and resetting the proportion of the first and second said signal in response to the third steering solution when the third test quality exceeds the receiver test quality.

29. The method according to claim 28, further comprising:

generating a new test steering solution in response to the first and second radio signals;

measuring a new test signal quality of a new test signal responsive to the new test steering solution; and resetting the receiver signal in response to the new steering solution when the new test quality exceeds the receiver test quality.

\* \* \* \* \*

UNITED STATES PATENT AND TRADEMARK OFFICE
CERTIFICATE OF CORRECTION

PATENT NO.        : 7,099,644 B2                                     Page 1 of 1
APPLICATION NO. : 10/040857
DATED             : August 29, 2006
INVENTOR(S)      : J. William Whikehart et al.

It is certified that error appears in the above-identified patent and that said Letters Patent is hereby corrected as shown below:

In the Claims

Column 8, in claim 4, line 41, after "and second" delete "RE" and substitute --RF-- in its place.

Column 9, in claim 9, line 9, immediately after "first mixer circuit" insert --,-- (comma).

Column 10, in claim 22, lines 23-24, immediately after "further comprising" delete ":" (colon).

Column 10, in claim 23, line 30, immediately after "receiver signal" insert --;-- (semicolon).

Signed and Sealed this

Twelfth Day of December, 2006

JON W. DUDAS
*Director of the United States Patent and Trademark Office*